(12) United States Patent
Lee

(10) Patent No.: US 9,853,259 B2
(45) Date of Patent: Dec. 26, 2017

(54) BATTERY PACK HAVING SUPPORT STRUCTURE FOR SUPPORTING PLURALITY OF BATTERY CELLS

(71) Applicant: SAMSUNG SDI CO., LTD., Yongin-si, Gyeonggi-do (KR)

(72) Inventor: Won-Il Lee, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 689 days.

(21) Appl. No.: 14/199,356

(22) Filed: Mar. 6, 2014

(65) Prior Publication Data

US 2014/0356672 A1 Dec. 4, 2014

Related U.S. Application Data

(60) Provisional application No. 61/830,873, filed on Jun. 4, 2013.

(51) Int. Cl.
*H01M 2/10* (2006.01)
*H01M 10/42* (2006.01)

(52) U.S. Cl.
CPC ....... *H01M 2/1061* (2013.01); *H01M 10/425* (2013.01); *H01M 2010/4271* (2013.01); *H01M 2220/30* (2013.01)

(58) Field of Classification Search
CPC ...... H01M 2/10; H01M 10/42; H01M 2/1061; H01M 10/425; H01M 2010/4271; H01M 10/425
See application file for complete search history.

(56) References Cited

U.S. PATENT DOCUMENTS

| 8,318,341 | B2* | 11/2012 | Kim | H01M 2/0207 429/162 |
| 2006/0091891 | A1 | 5/2006 | Woo et al. | |
| 2006/0244415 | A1* | 11/2006 | Denison | H02J 7/0054 320/112 |
| 2006/0244416 | A1 | 11/2006 | Yong et al. | |
| 2008/0081254 | A1* | 4/2008 | Kim | H01M 2/1061 429/163 |
| 2009/0023058 | A1* | 1/2009 | Kim | H01M 2/0207 429/131 |
| 2009/0111018 | A1 | 4/2009 | Park et al. | |
| 2010/0151313 | A1* | 6/2010 | Kosugi | H01M 2/1016 429/158 |

(Continued)

FOREIGN PATENT DOCUMENTS

| CN | 101425601 A | 5/2009 |
| CN | 102751454 A | 10/2012 |

(Continued)

OTHER PUBLICATIONS

Search Report dated Oct. 6, 2014 in corresponding European Patent Application No. 13182875.8.
Chinese Office Action dated Jun. 26, 2017.

*Primary Examiner* — Alex Usyatinsky
(74) *Attorney, Agent, or Firm* — Lee & Morse, P.C.

(57) ABSTRACT

A battery pack includes a battery cell and a frame having an opening in which the battery cell is installed, an edge of the opening including a support portion contacting a side of the battery cell, the support portion having a surface corresponding to a surface of the battery cells.

13 Claims, 5 Drawing Sheets

(56) References Cited

U.S. PATENT DOCUMENTS

| | | | |
|---|---|---|---|
| 2011/0091764 A1* | 4/2011 | Kim | H01M 2/0207 429/163 |
| 2011/0305930 A1 | 12/2011 | Han | |
| 2012/0015216 A1* | 1/2012 | Park | H01M 2/1061 429/7 |
| 2012/0214024 A1 | 8/2012 | Moon et al. | |
| 2012/0219851 A1* | 8/2012 | Kim | H01M 2/0207 429/175 |
| 2012/0257349 A1* | 10/2012 | Bang | H01M 10/425 361/679.55 |
| 2012/0270074 A1 | 10/2012 | Koh | |
| 2013/0089755 A1 | 4/2013 | Park et al. | |

FOREIGN PATENT DOCUMENTS

| | | |
|---|---|---|
| CN | 103050655 A | 4/2013 |
| EP | 2017909 * | 1/2009 |
| EP | 2017909 A1 | 1/2009 |
| EP | 2056374 A1 | 5/2009 |
| EP | 2408042 A1 | 1/2012 |
| JP | 2011-129668 A | 6/2011 |
| KR | 10-2006-0105208 A | 10/2006 |
| KR | 10-2006-0105208 A8 | 10/2006 |
| KR | 10-2011-0072241 A | 6/2011 |
| KR | 10-2011-0130848 A | 12/2011 |
| KR | 10-2012-0094706 A | 8/2012 |

* cited by examiner

BATTERY PACK HAVING SUPPORT STRUCTURE FOR SUPPORTING PLURALITY OF BATTERY CELLS

CROSS-REFERENCE TO RELATED APPLICATION

This application claims priority to U.S. Provisional Application No. 61/830,873, filed in the U.S. Patent and Trademark Office on Jun. 4, 2013, and entitled "BATTERY PACK," which is hereby incorporated by reference herein in its entirety for all purposes.

BACKGROUND

1. Field

Embodiments relate to a battery pack.

2. Description of the Related Art

With the development of wireless internet and communication technology, portable computers such as tablet PCs or notebook computers that may be driven by using a battery without a power supply device have been distributed rapidly. In general, portable computers are small and convenient to move, and thus widely used as for business or personal purposes. In addition, in order to use portable computers freely in any kind of space without regard to an external power supply device, the portable computers may include a built-in battery pack. Such a battery pack may be formed as a module by electrically connecting a plurality of battery cells, each of which may be chargeable and dischargeable, to configure a large capacity and high output power supply device.

SUMMARY

Embodiments are directed to a battery pack, including a battery cell and a frame having an opening in which the battery cell is installed, an edge of the opening including a support portion contacting a side of the battery cell, the support portion having a surface corresponding to a surface of the battery cell.

The support portion may include a projecting member that extends into the opening, the projecting member having a tapered cross-section.

The projecting member may overlap the battery cell.

The projecting member may extend along a length of the side of the battery cell.

The battery cell may have a rectangular shape having first, second, third, and fourth sides, the first side being opposite the second side, and the third side being opposite the fourth side, and the battery cell may have curved surfaces at the third and fourth sides.

The opening may include support portions contacting the third and fourth sides of the battery cell, each of the support portions having a curved surface corresponding to the curved surfaces of the third and fourth sides of the battery cell.

The battery cell may include an electrode assembly wound in a jelly roll, the electrode assembly having curved edges corresponding to the third and fourth sides of the battery cell, and the curved surfaces of the support portions may each have a curve that approximates the curved edges of the electrode assembly.

The curved surfaces of the support portions may form respective projecting members that extend into the opening, the projecting members each having a tapered cross-section, and the projecting members may not extend beyond the curved surfaces of the third and fourth sides of the battery cell.

The battery cell may include an electrode assembly installed in a pouch, the electrode assembly being wound in a jelly roll having opposing curved surfaces, the pouch having opposing curved surfaces at the third and fourth sides of the battery cell corresponding to the opposing curved surfaces of the electrode assembly, the pouch may include bonding portions at a first side and the third and fourth sides of the battery cell, the bonding portions sealing the pouch, and the bonding portions at the third and fourth sides may be folded along the curved surfaces of the electrode assembly, the bonding portions contacting respective support portions of the opening and being deformed to have a curve that corresponds to curved surfaces of the respective support portions.

The curved surfaces of the third and fourth sides of the battery cell may have a height that is substantially the same as a thickness of the frame, and the opening may have respective support portions with curved surfaces corresponding to the curved surfaces of the third and fourth sides of the battery cell, the curved surfaces of the support portions overlapping the curved surfaces of the third and fourth sides of the battery cell.

The frame may include a plurality of openings, a plurality of battery cells being installed therein, each of the openings for the battery cells including support portions with surfaces corresponding to surfaces of the battery cells.

The battery pack may further include a protective circuit module. The frame may include a circuit mounting portion to which the protective circuit module is mounted, the circuit mounting portion being disposed at a central portion of the frame, the frame may include a plurality of openings, a plurality of battery cells being installed therein, the openings being disposed on opposite sides of the circuit mounting portion, and the protective circuit module may be electrically connected to each of the battery cells.

The battery cells may each include a first side from which electrode tabs extend, and the protective circuit module may be connected to lead plates, the lead plates extending along the first sides of the battery cells, the lead plates being electrically connected to the electrode tabs.

Battery cells of a first group of battery cells on a first side of the protective circuit module may be connected to each other by a first lead plate, and battery cells of a second group of battery cells on a second side of the protective circuit module, opposite the first side, may be connected to each other by a second lead plate.

The opening may have a height that is substantially the same as a thickness of the battery cell.

The opening may include support portions corresponding to at least three sides of the battery cell.

The opening may penetrate the frame and the battery cell may have major surfaces exposed by the opening at opposite surfaces of the frame.

The edge of the opening may include a curved portion corresponding to the support portion, and a noncurved portion extending from the support portion in a thickness direction of the battery cell.

The battery pack may further include an insulation plate, the battery cell being fixed in the opening of the frame between the support portion and the insulation plate.

The frame may include a plurality of openings, a plurality of battery cells being installed therein, and the insulation plate may extend across the plurality of battery cells.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art. In the drawing figures, dimensions may be exaggerated for clarity of illustration. Like reference numerals refer to like elements throughout.

Figure 1:
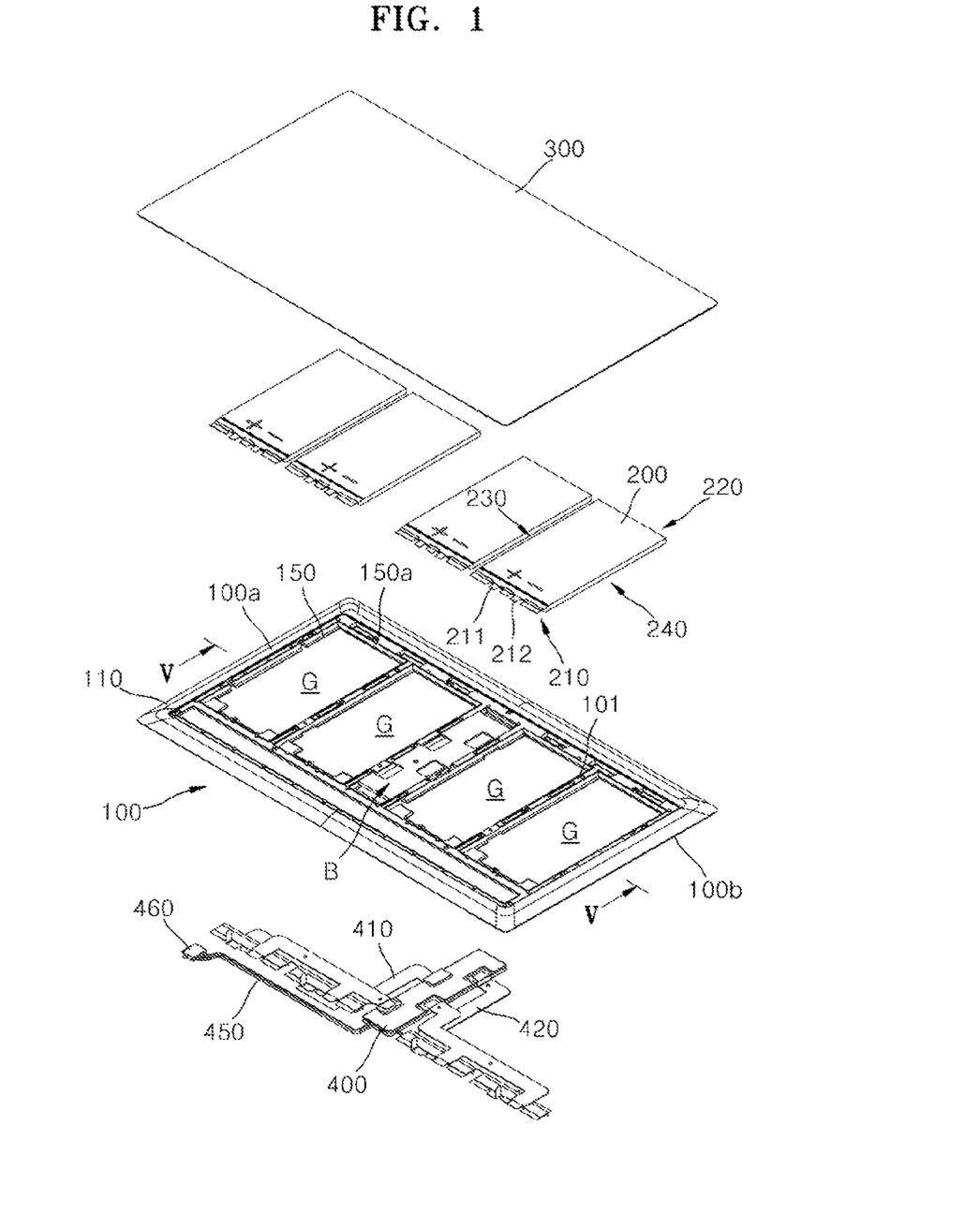
FIG. 1 illustrates an exploded perspective view of a battery pack according to an example embodiment.
Figure 2:
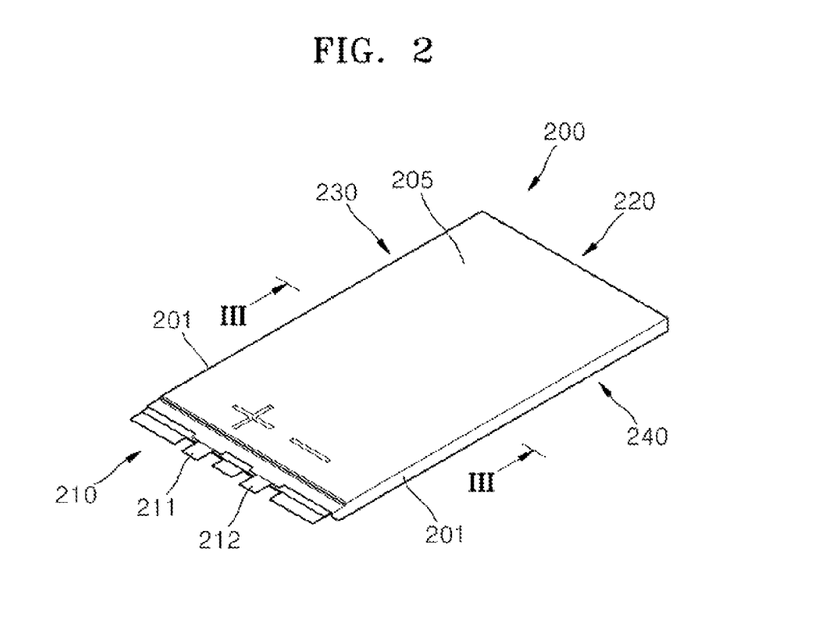
FIG. 2 illustrates a perspective view of a battery cell included in the battery pack of FIG. 1.
Figure 3:
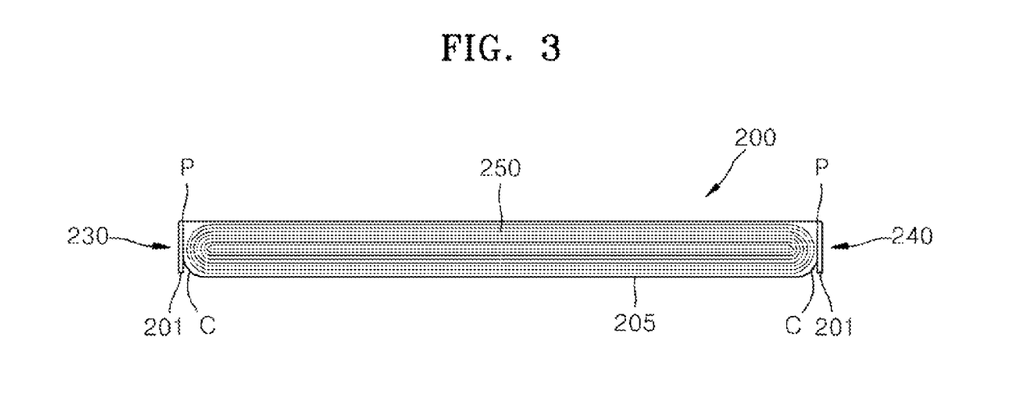
FIG. 3 illustrates a cross-sectional view of the battery cell taken along a line III-III of FIG. 2.

FIG. 1 illustrates an exploded perspective view of a battery pack according to an example embodiment, FIG. 2 illustrates a perspective view of a battery cell included in the battery pack 200 of FIG. 1, and FIG. 3 illustrates a cross-sectional view of the battery cell 200 taken along a line of FIG. 2.

In the example embodiment shown in FIG. 1, the battery pack includes a plurality of battery cells 200, a frame 100 for supporting the battery cells 200, and a protective circuit module 400 supported on the frame 100 with the battery cell 200 for controlling charging/discharging operations of the battery cell 200.

Referring to FIGS. 2 and 3, the battery cell 200 includes an electrode assembly 250, and a pouch 205 for sealing the electrode assembly 250.

The electrode assembly 250 may be formed by, for example, stacking a positive plate on which a positive active material is applied, a negative plate on which a negative active plate is applied, and a separator disposed between the positive plate and the negative plate, and winding the stacked substances as a jelly roll type. In another implementation, the electrode assembly may be manufactured by stacking the positive plate, the separator, and the negative plate sequentially for a plurality of times.

A first electrode tap 211 and a second electrode tap 212 of different polarities may be connected to the electrode assembly 250. The first and second electrode taps 211 and 212 may be drawn to outside via a first side portion 210 of the battery cell 200, and may be electrically connected to the protective circuit module 400 as will be described later.

The pouch 205 may include a pair of side wings 201 formed by fusion bonding operations. The pair of side wings 201 may be disposed on side portions 230 and 240 of the battery cell 200. For example, the pair of side wings 201 may be bent and disposed on the side portions 230 and 240 of the battery cell 200.

The battery cell 200 may be formed as a hexahedron including two main surfaces, one of which faces the frame 100 and the other of which is opposite to the above surface, and side portions 210, 220, 230, and 240 between the main surfaces.

For example, the side portions 210, 220, 230, and 240 may include side surfaces and corners of the battery cell 200. In an implementation, the side portions 210, 220, 230, and 240 of the battery cell 200 may include a first side portion 210 through which the electrode taps 211 and 212 are withdrawn, a second side portion 220 formed opposite to the first side portion 210, and third and fourth side portions 230 and 240 extending in parallel with each other between the first and second side portions 210 and 220.

For example, the third and fourth side portions 230 and 240 of the battery cell 200 may include rounded corners C. Thus, the third and fourth side portions 230 and 240 of the battery cell 200 may be formed as curves along corners of the electrode assembly 250, which are wound as oval shapes. The rounded corners C may be corners that are farther from bending points P in the third and fourth side portions 230 and 240. For example, corners closer to the bending points P may be angled for forming the side wings 201.

In the example embodiment shown in FIG. 1, the frame 100 configures an appearance of the entire battery pack, and supports the battery cell 200 and the protective circuit module 400.

The frame 100 may support a plurality of battery cells 200. According to the present example embodiment shown in FIG. 1, the plurality of battery cells 200 may be arranged in parallel with each other, and the electrode taps 211 and 212 withdrawn from each of the battery cells 200 may extend in parallel with each other and may be collected at a side of the frame 100. In another implementation, the plurality of battery cells 200 may be arranged to face each other so as to form a plurality of pairs of two battery cells 200, and the electrode taps 211 and 212 from each pair of the battery cells 200 may be extended in a direction of facing each other.

The frame 100 may include assembling openings G for accommodating the battery cells 200. According to the present example embodiment, the assembling openings G are formed as holes opened to upper and lower portions, which may help to form a thin and light battery pack.

Figure 4:
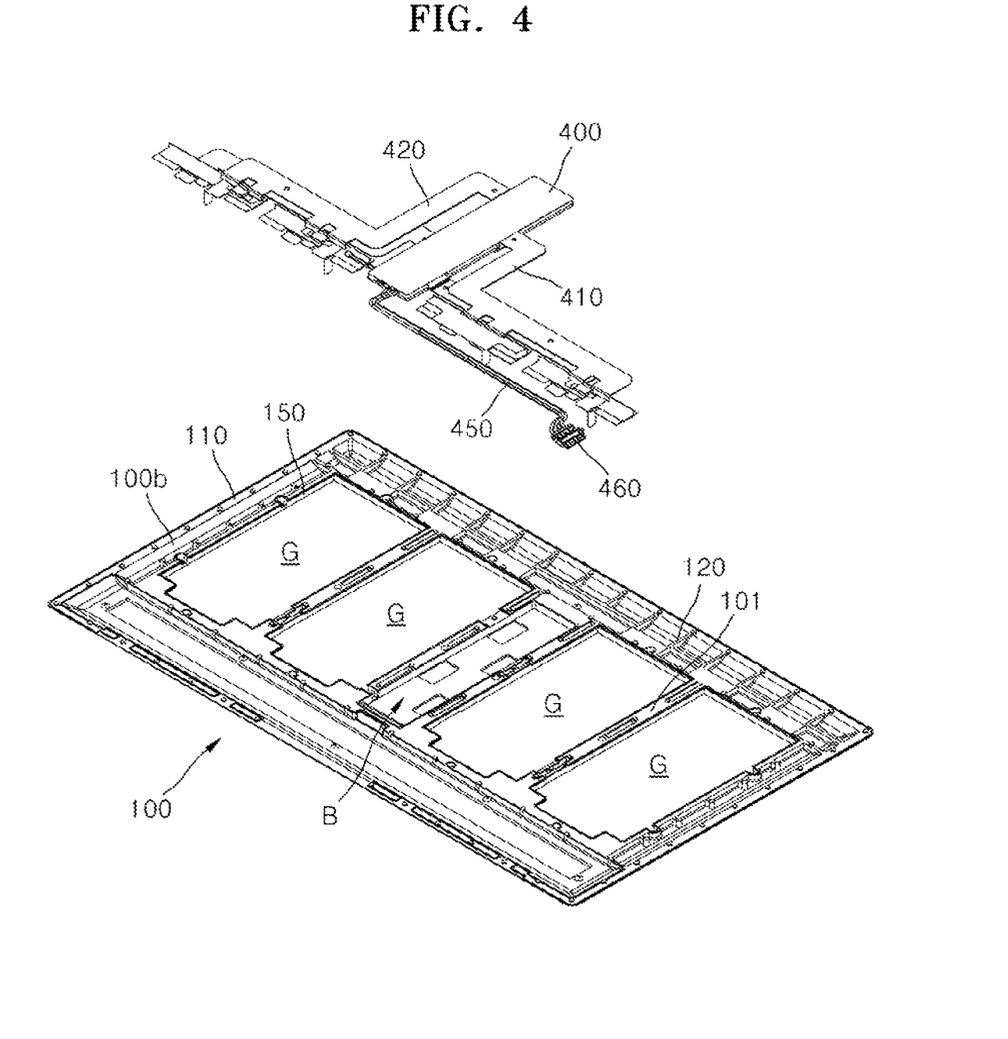
FIG. 4 illustrates an exploded perspective view of the battery pack of FIG. 1 seen from an opposite side of a frame shown in FIG. 1.

FIG. 4 shows the frame 100 of FIG. 1 from an opposite direction. As shown in FIG. 4, the frame 100 may include a circuit mounting portion B for accommodating the protective circuit module 400. The circuit mounting portion B may be formed as a concave recess having a shape corresponding to that of the protective circuit module 400.

For example, the circuit mounting portion B may be formed at a center of the frame 100, and the assembling openings G may be formed at opposite sides of the circuit mounting portion B. The protective circuit module 400 may be electrically connected to the plurality of battery cells 200, and thus may be disposed at the center to reduce electric connection paths to the battery cells 200.

The assembling openings G and the circuit mounting portion B may be formed from independently each other by barriers 101 extending across the frame 100. Thus, the battery cells 200 and the protective circuit module 400 accommodated in the assembling openings G and the circuit mounting portion B may not mechanically interfere with neighboring elements, and may be electrically insulated from the neighboring elements.

The frame 100 may include a strength reinforcing portion 120. The strength reinforcing portion 120 may include a plurality of ribs that extend along a direction in parallel with each other, for example, on a plane of the frame 100. The strength reinforcing portion 120 may provide mechanical rigidity to help resist against warping and bending deformation, while reducing an entire weight of the frame 100. The frame 100 may be formed in an injection molding process by using an insulating resin.

As shown in FIGS. 1 and 4, the frame 100 may include a first surface 100a and a second surface 100b. In addition, the battery cells 200 may be assembled on, for example, the first surface 100a of the frame 100, and the protective circuit module 400 may be assembled on, for example, the second surface 100b of the frame 100. In another implementation, the battery cells 200 and the protective circuit module 400 may be assembled on the first surface 100a or the second surface 100b together.

Referring to FIG. 1, the frame 100 may include a frame main body 110 including the assembling openings G, and support portions 150 protruding from the frame main body 110 toward the assembling openings G to support edges of the battery cells 200.

For example, the support portions 150 may support the third and fourth side portions 230 and 240 of each battery cell 200 so that the battery cell 200 does not fall down through the assembling opening G. The assembling openings G may be formed as holes, and the support portion 150 may protrude from the frame main body so as to prevent the battery cells 200 from falling down through the holes, i.e., the assembling openings G.

For example, the support portions 150 may be configured to surround one or more side portions 210, 220, 230, or 240 of the battery cell 200. According to an example embodiment, the battery cell 200 includes the first side portion 210 through which the electrode taps 211 and 212 are withdrawn, the second side portion 220 formed opposite to the first side portion 210, and the third and fourth side portions 230 and 240 extending in parallel with each other between the first and second side portions 210 and 220. The support portion 150 may be formed on a side portion of the assembling opening G, which faces one of the side portions 220, 230, and 240 of the battery cell 200, so as to surround at least one side portion of the second through fourth side portions 220, 230, and 240, except for the first side portion 210 through which the electrode taps 211 and 212 are withdrawn.

According to the present example embodiment, the support portions 150 may extend along a direction that is in parallel with the side portions 230 and 240 of the battery cell 200 so as to surround the side portions 230 and 240 of the battery cell 200. The support portions 150 may extend in parallel with the third and fourth side portions 230 and 240 of the battery cell 200 so as to surround the third and fourth side portions 230 and 240 of the battery cell 200.

Also, the support portions 150 may extend along with three side portions of the assembling opening G, which face the second, third, and fourth side portions 220, 230, and 240 of the battery cell 200. Thus, as shown in FIG. 1, the support portion 150 may further include an additional support portion 150a extending along the second side portion 220 of the battery cell 200. By supporting the three side portions, for example, second through fourth side portions 220, 230, and 240 of the battery cell 200, the support portion 150 may stably support the battery cell 200.

Figure 5A:
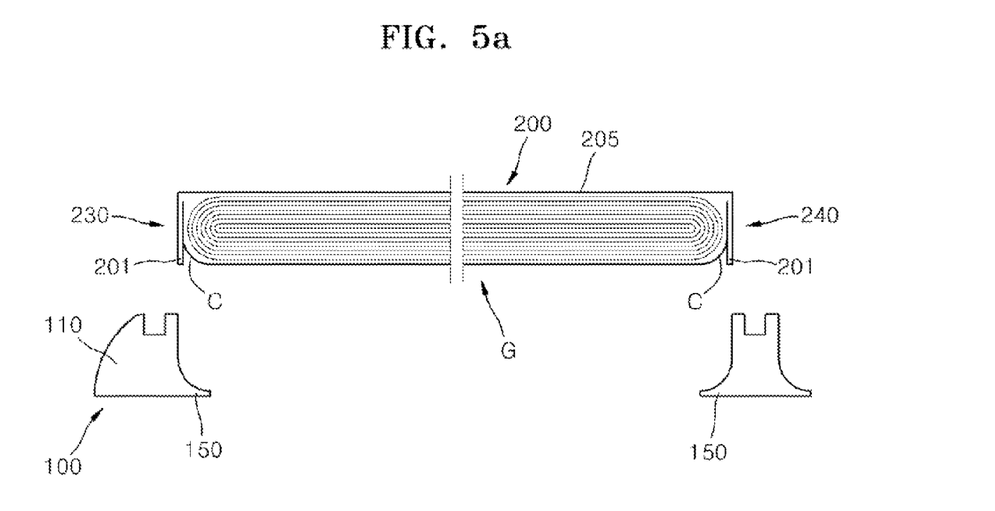
FIGS. 5A and 5B illustrate cross-sectional views of the battery pack taken along a line V-V of FIG. 1 for an assembling process between a frame and a battery cell.
Figure 5B:
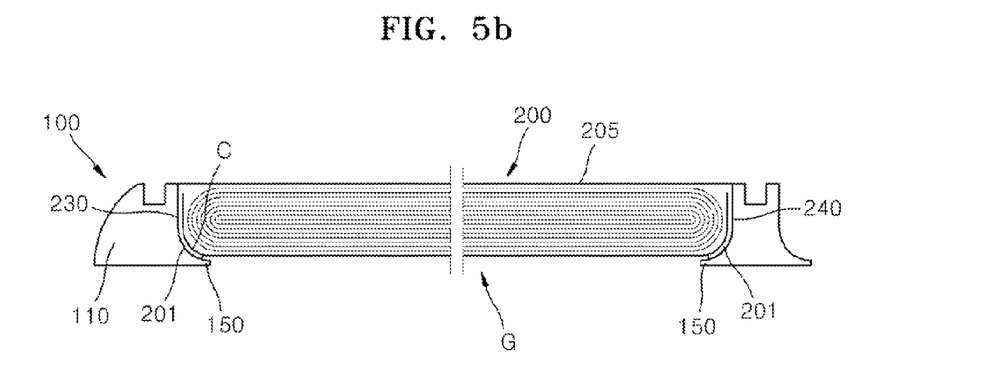

FIGS. 5A and 5B illustrate cross-sectional views of the battery pack taken along a line V-V of FIG. 1, for illustrating assembling processes of the frame 100 and the battery cell 200.

Referring to FIGS. 5A and 5B, the support portion 150 protruding from the frame main body 110 toward the assembling opening G may be formed as a curved surface to surround the side portions 230 and 240 of the battery cell 200. Thus, the support portion 150 may provide a curvature type of support surface surrounding the rounded corner C of the side portion 230 or 240 of the battery cell 200. For example, the third and fourth side portions 230 and 240 of the battery cell 200 may include the rounded corner C respectively, and the support portion 150 may include a curved type support surface so as to adhere to the rounded corner C of the battery cell 200.

For example, the support portion 150 may protrude from the frame main body 110 toward the assembling opening G along soft curve. The battery cell 200 may be supported by the supporting portion 150 adhering the outer surface of the battery cell 200, and thus movement of the battery cell 200 caused due to a gap between the battery cell 200 and the frame 100 may be prevented, and the battery cell 200 may be stably supported. The supporting portion 150 that is rounded as a curve may contribute to form a thin battery pack.

The following comparative examples are provided in order to highlight characteristics of one or more embodiments, but it will be understood that the comparative examples are not to be construed as limiting the scope of the embodiments, nor are the comparative examples to be construed as being outside the scope of the embodiments. Further, it will be understood that the embodiments are not limited to the particular details discussed with respect to the comparative examples.

Figure 6:
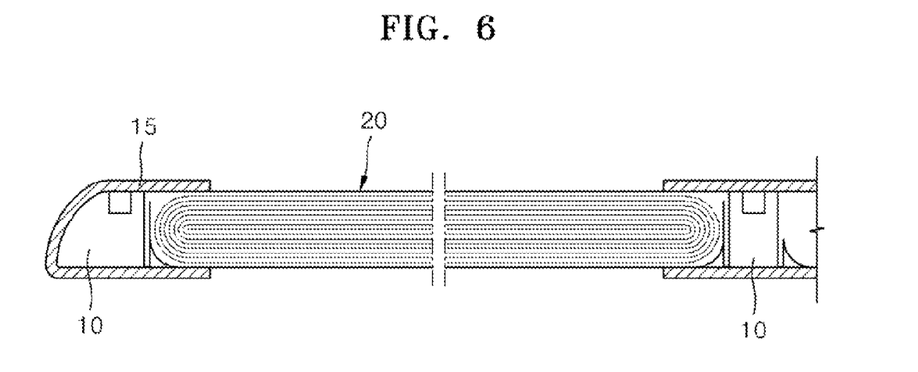
FIG. 6 illustrates a cross-sectional view of a battery pack according to a comparative example.

FIG. 6 is a diagram showing a battery pack according to a comparative example. As shown in FIG. 6, according to the comparative example, a tape 15 is attached onto a frame 10 in which a battery cell 20 is inserted and assembled so as to fix the battery cell 20 on the frame 10 and to prevent the battery cell 20 from escaping from the frame 10. In the attaching method that uses the tape, creases may be formed on the outer surface of the battery cell 20 due to the taping, and thus outer appearance of the battery cell 20 may be degraded. Also, according to the characteristics of the taping operation, it may be difficult to detach the tape 15 attached to the battery cell 20, which may degrade an operating property. Also, according to the attaching method using the tape 15, the battery cell 20 may be dropped from the frame 10 due to external shock depending on an attaching strength of the tape 15.

According to the example embodiment shown in FIGS. 5A and 5B, the supporting portion 150 is integrally formed with the frame 100. Thus, an additional member such as a tape may be omitted. In addition, since a taping operation may be omitted, the overall number of processes may be reduced. Also, quality degradation caused due to the taping operation may be avoided. For example, the supporting portion 150 may be integrally formed with the frame 100 through an injection molding operation, and an additional process or an additional element for supporting the battery cell 200 may be omitted. As such, the battery cell 200 may be supported by the supporting portion 150 that is integrally formed with the frame 100, and thus the battery cell 200 may be stably supported despite external shock or vibration.

Figure 7:
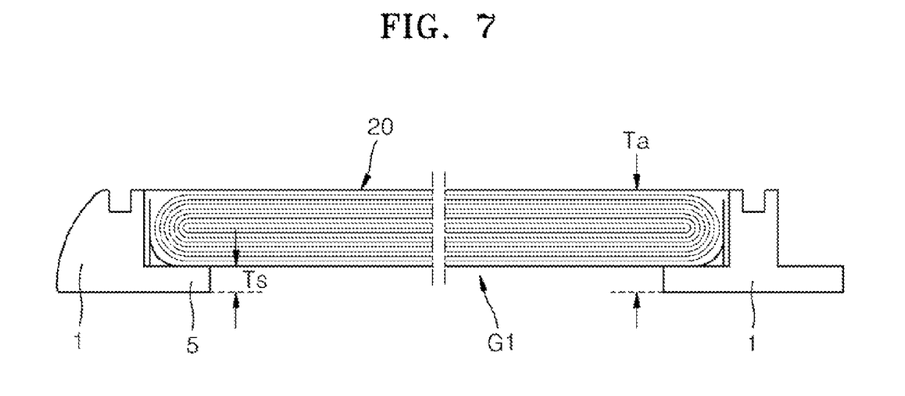
FIG. 7 illustrates a cross-sectional view of a battery pack according to another comparative example.

FIG. 7 illustrates a diagram showing a battery pack according to another comparative example. In the battery pack shown in FIG. 7, a supporting portion 5 surrounding a side portion of a battery cell 20 is formed as bent form, not a rounded shape. Thus, the supporting portion 5 extends from a frame main body 1 in a bent direction to be branched from the frame main body 1. In such a structure, the support portion 5 may have a thickness Ts greater than desired. Further, if the supporting portion 5 branched from the frame main body 1 and protruding toward an assembling opening G1 is formed to be thin, the supporting portion 5 may not stably support the battery cell 20 and may be easily broken by an external weight. Thus, the supporting portion 5 may be formed to have a thickness Ts that is greater than a predetermined level. A thickness Ta of the entire battery pack is a sum of a thickness of the battery cell 20 and the thickness Ts of the supporting portion 5. Thus, the entire thickness of the battery pack may increase.

In the example embodiment shown in FIGS. 5A and 5B, the supporting portion 150 is not branched from the frame main body 100, but is formed integrally with the frame main body 100. Thus, the mechanical strength of the supporting portion 150 itself may not be a significant factor. In addition, the thickness of the supporting portion 150 may not added significant thickness to the entire battery pack, and thus a thin battery pack may be manufactured. Even when the battery pack is thin, the supporting portion 150 may support the battery cell 200 with a sufficient strength, and may have sufficient durability against external weight.

Referring to FIGS. 5A and 5B, the supporting portion 150 may insulate and protect the side wings 201 of the battery cell 200. In an implementation, the supporting portion 150 is formed to surround the side portions 230 and 240 of the battery cell 200. The supporting portion 150 surrounds the side wings 201 formed on the side portions 230 and 240 of the battery cell 200 to insulate and protect the side wings 201 from external environment. For example, the side wings 201 may overlap the supporting portion 150, and thus may be curved along with the rounded shape of the supporting portion 150.

For example, the side wings 201 may be formed by folding a fusion bonding portion of the pouch 205 onto the third and fourth side portions 230 and 240 of the battery cell 200 to make an outer appearance of the battery cell 200 compact. The supporting portion 150 may surround the side wings 201 with the third and fourth side portions 230 and 240 of the battery cell 200 so that the side wings 201 may be adhered onto the third and fourth side portions 230 and 240 of the battery cell 200. If the side wings 201 are not sufficiently supported and right locations of the side wings 201 are not defined, movement or fluttering of the side wings 201 may cause interference with peripheral components.

A cross-sectional shape of the pouch 205 may be exposed through edges of the side wings 201, for example, the cross-section in which metal sheet (not shown) with insulating sheets stacked on opposite sides of the metal sheet (not shown), may be exposed. If the edges of the side wings 201 are conductively connected to the peripheral components, electric shorts may occur, which may have undesirable effects on charging and discharging operations of the entire battery pack.

According to the present example embodiment, the supporting portions 150 surrounding the side wings 201 with the side portions 230 and 240 of the battery cell 200 to insulate and protect the side wings 201 from peripheral components. A tape member that is generally used to attach the side wings 201 to the side portions 230 and 240 of the battery cell 200 may be omitted.

Referring back to FIG. 1, the plurality of battery cells 200 may be electrically connected to each other in series, in parallel, or in series and parallel by lead plates 410 and 420. The plurality of battery cells 200 may be electrically modulated via the lead plates 410 and 420.

For example, the first electrode tap 211 and the second electrode tap 212 may be formed on the first side portion 210 of each battery cell 200. The lead plates 410 and 420 may extend in a direction along the first side portions 210 of the battery cells 200 so as to be electrically connected to the first and second electrode taps 211 and 212 of neighboring battery cells 200. For example, the lead plates 410 and 420 may include one or more conductive plates (not shown) forming a current path, and insulating tapes (not shown) coated on outer surfaces of the conductive plates.

Ends of the lead plates 410 and 420 may be connected to the protective circuit module 400. For example, the protective circuit module 400 may measure status variables of the battery cell 200, such as a temperature, a voltage, and a current, to monitor operations of the battery cell 200, and may control the charging and discharging operations of the battery cell 200 according to the monitoring result.

The lead plates 410 and 420 may include the first lead plate 410 for electrically connecting the protective circuit module 400 and a group of battery cells 200 disposed at a side of the protective circuit module 400, and the second lead plate 420 for electrically connecting the protective circuit module 400 and another group of battery cells 200 disposed at the other side of the protective circuit module 400.

For example, discharging currents of the battery cells 200 may be input to the protective circuit module 400 via the first and second lead plates 410 and 420, and may be connected to a set device (not shown) via the protective circuit module 400. In this regard, a connection member 450 for electrically connecting to the set device may be connected to the protective circuit module 400. For example, the connection member 450 may include a plurality of wires. The battery pack may be built in a set device to form a power supply device, and may be electrically connected to the set device via the connection member 450 including a plurality of wires for transferring signals and supplying an electric power.

In another example embodiment, the connection member 450 may include a printed circuit board on which a plurality of wires are patterned. For example, the connection member 450 may include a flexible printed circuit board (FPCB). In addition, a connector 460 for electrically connecting to the set device may be disposed at an end of the connection member 450.

The battery pack shown in FIG. 1 may include an insulating plate 300 disposed to cover a first surface 100a of the frame 100. The insulating plate 300 may cover the first surface 100a of the frame 100 so that the battery cell 200 does not escape from the frame 100. For example, the battery cell may be mounted on the supporting portions 150 of the frame 100, and the insulating plate 300 may cover the battery cell 200 so as to prevent the battery cell 200 from escaping from the frame 100.

For example, the battery cell 200 may be firmly fixed on the frame 100 by the insulating plate 300 disposed on the first surface 100a of the frame 100 and the supporting portions 150 formed at a second surface 100b side of the frame 100, and may not escape from the frame 100. In this regard, the insulating plate 300 may be disposed at the first surface 100a of the frame 100, which is opposite to the second surface 100b on which the supporting portions 150 are formed. The insulating plate 300 may cover the first surface 100a of the frame 100, and may cover at least the first surface 100a of the frame 100, which corresponds to the battery cells 200.

For example, the insulating plate 300 may be assembled on the frame 100 or may be fixedly attached onto the frame 100. The insulating plate 300 may be formed of an insulating material such as polyethylene terephthalate (PET), and may be formed to have a plate shape.

As described above, a battery pack may include a support structure for supporting the plurality of battery cells and binding the plurality of battery cells as a battery pack.

Example embodiments may provide a battery pack capable of reducing the number of components and a number of assembly processes. Example embodiments may provide a battery pack suitable for a thin type device. According to an example embodiment, the battery cells are supported by the supporting portions integrally formed with the frame main body. Thus an additional tape member for fixing the battery cells may not be necessary, and a taping process having a low workability may be omitted. According to an example embodiment, the supporting portions may protrude from the frame main body as rounded curves, which may enable the manufacture of a thin battery pack.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

EXPLANATION OF REFERENCE NUMERALS DESIGNATING THE MAJOR ELEMENTS OF THE DRAWINGS

| | |
|---|---|
| 100: frame | 100a: first surface of frame |
| 100b: second surface of frame | 101: barrier wall |
| 110: frame main body | 150: supporting portion |
| 150a: additional supporting portion | 200: battery cell |
| 201: side wing | 210: first side portion |
| 211: first electrode tap | 212: second electrode tap |
| 220: second side portion | 230: third side portion |
| 240: fourth side portion | 300: insulating plate |
| 400: protective circuit module | 410: first lead plate |
| 420: second lead plate | 450: connection member |
| 460: connector | C: corner of battery cell |
| B: circuit mounting portion | P: bending point |

What is claimed is:

1. A battery pack, comprising:
a plurality of battery cells; and
a frame having an opening in which a respective one of the battery cells is installed, an edge of the opening including a support portion contacting a side of the respective battery cell, the support portion having a curved surface corresponding to a surface of the respective battery cell and extending into the opening, the support portion having a tapered cross-section corresponding to the curved surface, the curved surface extending along a longitudinal length of the side of the battery cell, wherein:
the battery cell has a rectangular shape having first, second, third, and fourth sides, the first side being opposite the second side, and the third side being opposite the fourth side,
the battery cell has curved surfaces at the third and fourth sides,
the battery cell includes an electrode assembly installed in a pouch, the electrode assembly being wound in a jelly roll having opposing curved surfaces, the pouch having opposing curved surfaces at the third and fourth sides of the battery cell corresponding to the opposing curved surfaces of the electrode assembly,
the pouch includes bonding portions at a first side and the third and fourth sides of the battery cell, the bonding portions sealing the pouch, and
the bonding portions at the third and fourth sides are folded along the curved surfaces of the electrode assembly, the bonding portions contacting respective support portions of the opening and being deformed to have a curve that corresponds to curved surfaces of the respective support portions.

2. The battery pack as claimed in claim 1, wherein the support portion overlaps the battery cell.

3. The battery pack as claimed in claim 1, wherein:
the support portions do not extend beyond the curved surfaces of the third and fourth sides of the battery cell.

4. The battery pack as claimed in claim 1, wherein the frame includes a plurality of openings, a plurality of battery cells being installed therein, each of the openings for the battery cells including support portions with surfaces corresponding to surfaces of the battery cells.

5. The battery pack as claimed in claim 1, further comprising a protective circuit module, wherein:
the frame includes a circuit mounting portion to which the protective circuit module is mounted, the circuit mounting portion being disposed at a central portion of the frame,
the frame includes a plurality of openings, a plurality of battery cells being installed therein, the openings being disposed on opposite sides of the circuit mounting portion, and
the protective circuit module is electrically connected to each of the battery cells.

6. The battery pack as claimed in claim 5, wherein:
the battery cells each include a first side from which electrode tabs extend, and
the protective circuit module is connected to lead plates, the lead plates extending along the first sides of the battery cells, the lead plates being electrically connected to the electrode tabs.

7. The battery pack as claimed in claim 6, wherein:
battery cells of a first group of battery cells on a first side of the protective circuit module are connected to each other by a first lead plate, and
battery cells of a second group of battery cells on a second side of the protective circuit module, opposite the first side, are connected to each other by a second lead plate.

8. The battery pack as claimed in claim 1, wherein the opening has a height that is substantially the same as a thickness of the battery cell.

9. The battery pack as claimed in claim 1, wherein the opening includes support portions corresponding to at least three sides of the battery cell.

10. The battery pack as claimed in claim 1, wherein the opening penetrates the frame and the battery cell has major surfaces exposed by the opening at opposite surfaces of the frame.

11. The battery pack as claimed in claim 1, wherein the edge of the opening includes a curved portion corresponding to the support portion, and a noncurved portion extending from the support portion in a thickness direction of the battery cell.

12. The battery pack as claimed in claim 11, further comprising an insulation plate, the battery cell being fixed in the opening of the frame between the support portion and the insulation plate.

13. The battery pack as claimed in claim 12, wherein:
the frame includes a plurality of openings, a plurality of battery cells being installed therein, and
the insulation plate extends across the plurality of battery cells.

* * * * *